United States Patent
Kim et al.

(10) Patent No.: US 8,160,108 B2
(45) Date of Patent: Apr. 17, 2012

(54) APPARATUS AND METHOD FOR MANAGING SCHEDULE OF USER

(75) Inventors: Yong-ku Kim, Suwon-si (KR); Myong-kyun Lim, Seoul (KR); Hyo-sun Shim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1044 days.

(21) Appl. No.: 12/020,777

(22) Filed: Jan. 28, 2008

(65) Prior Publication Data

US 2008/0268902 A1  Oct. 30, 2008

(30) Foreign Application Priority Data

Apr. 25, 2007 (KR) .................. 10-2007-0040475

(51) Int. Cl.
*G06F 13/00* (2006.01)
(52) U.S. Cl. .......................... 370/485; 725/58
(58) Field of Classification Search .................. 370/485, 370/486; 725/39, 58
See application file for complete search history.

(56) References Cited

U.S. PATENT DOCUMENTS

| | | | |
|---|---|---|---|
| 2002/0046404 A1* | 4/2002 | Mizutani | 725/58 |
| 2002/0122080 A1 | 9/2002 | Kunii et al. | |
| 2003/0149978 A1* | 8/2003 | Plotnick | 725/39 |
| 2005/0193011 A1 | 9/2005 | Peebles et al. | |
| 2006/0005921 A1 | 1/2006 | Lee et al. | |
| 2006/0059521 A1* | 3/2006 | Lee et al. | 725/58 |
| 2006/0148528 A1 | 7/2006 | Jung et al. | |
| 2007/0016941 A1* | 1/2007 | Gonzalez et al. | 726/9 |
| 2008/0026790 A1 | 1/2008 | Nakao et al. | |
| 2008/0271075 A1* | 10/2008 | Kawai | 725/39 |

FOREIGN PATENT DOCUMENTS

| | | |
|---|---|---|
| JP | 2006-166008 | 6/2006 |
| KR | 2005-3921 | 1/2005 |
| KR | 2006-25378 | 3/2006 |
| KR | 10-0655971 | 12/2006 |
| WO | 2006/022059 A1 | 3/2006 |
| WO | 2006/070253 A2 | 7/2006 |

OTHER PUBLICATIONS

European Search Report dated Nov. 26, 2009 and issued in corresponding European Patent Application 08102113.1.
Korean Non-Final Rejection dated May 20, 2011 in Korean Patent Application No. 10-2007-0040475.
Chinese Office Action issued Jan. 28, 2011 in corresponding Chinese Patent Application 200810082302.2.
Chinese Office Action dated Jan. 31, 2012, from Chinese Patent Application 200810082302.2.

* cited by examiner

*Primary Examiner* — Brian Nguyen
(74) *Attorney, Agent, or Firm* — Staas & Halsey LLP

(57) ABSTRACT

A method and apparatus for managing a user schedule, the method including: receiving a reservation message from a service provider with which a service reservation by a user is registered; updating the user schedule by adding an entry to the user schedule according to information included in the reservation message; and providing the updated schedule of the user. According to the apparatus and method, the user can conveniently manage the schedule even when the user schedule information is not input manually.

29 Claims, 19 Drawing Sheets

FIG. 7A

Schedule

Date : 2007.01.20  2006. 12.

08:00  Meeting(8:00-9:00)
09:00
10:00
11:00  2007. 01.
12:00  Meeting(12:30-13:30)
13:00
14:00
16:00  Mee
18:00

KFC  (UPDATE) (U.LIST)
     (Favorite) (F.LIST)
     (SAVE) (R.LIST)

KFC RESERVATION
GOOD MORNING. KFC GOING WITH FAMILY.
THIS IS YOUR RESERVATION STATE.

☑ PLACE: SUWON KFC INGYE BRANCH
☑ DATE: 13:00 PM JANUARY 20, 2007
☑ NUMBER OF PERSONS:
    TWO (ONE ADULT, ONE CHILD)
☑ INQUIRY: 03-208-4500
☑ SITE: www.kfc.com KBS    16:30    KBS Sports

—701

APPARATUS AND METHOD FOR MANAGING SCHEDULE OF USER

CROSS-REFERENCE TO RELATED APPLICATION

This application claims the benefit of Korean Patent Application No. 2007-40475, filed on Apr. 25, 2007 in the Korean Intellectual Property Office, the disclosure of which is incorporated herein in its entirety by reference.

BACKGROUND OF THE INVENTION

1. Field of the Invention

Aspects of the present invention relate to a method and apparatus for managing a schedule of a user, and more particularly, to a method and apparatus for managing a schedule of a user without a need for the user to input the schedule.

2. Description of the Related Art

Using a portable terminal apparatus (such as a personal digital assistant (PDA) and a mobile phone) to manage a schedule has generally become more prevalent. Accordingly, if an Internet protocol (IP) mobile television function, which will be commercialized in the future, is added to a portable terminal apparatus, a user will be able to receive a user's schedule and broadcasting program information through the one portable terminal apparatus. However, there is an inconvenience if the user's schedule and the broadcasting program information are managed separately. In particular, if there are a large number of broadcasting channels, it is difficult to appropriately receive broadcasting program information in relation to the changing users schedule. Also, it is burdensome to input to the terminal apparatus a change in the schedule each time the schedule changes.

SUMMARY OF THE INVENTION

Aspects of the present invention provide a method and apparatus for managing a user schedule by which the user schedule is automatically updated even without the user inputting the user schedule. Aspects of the present invention also provide a method and apparatus for managing a user schedule in order to provide a broadcasting program list that changes in accordance with the user schedule.

According to an aspect of the present invention, there is provided a method of managing a user schedule, the method including: receiving a reservation message from a service provider with which a service reservation by a user is registered; updating the user schedule automatically or according to a user input by adding an entry to the user schedule according to information included in the reservation message; and providing the updated user schedule.

According to another aspect of the present invention, there is provided an apparatus for managing a user schedule, the apparatus including: a communication unit to receive a reservation message from a service provider with which a service reservation by a user is registered; and a control unit to update the user schedule automatically or according to a user input by adding an entry to the user schedule according to information included in the reservation message, and to provide the updated schedule of the user.

According to another aspect of the present invention, there is provided a computer-readable recording medium having embodied thereon a computer program for executing a method of managing a user schedule, wherein the method includes: receiving a reservation message from a service provider with which a service reservation by a user is registered; updating the user schedule automatically or according to a user input by adding an entry to the user schedule according to information included in the reservation message; and providing the updated schedule of the user.

According to yet another aspect of the present invention, there is provided a method of managing a user schedule in a terminal apparatus, the method including: providing a broadcasting program list including information on at least one broadcasting program that overlaps an entry in the user schedule, wherein the broadcasting program list does not include information on broadcasting programs that do not overlap at least one entry in the user schedule.

According to still another aspect of the present invention, there is provided an apparatus for managing a user schedule, the apparatus including: a broadcasting program information management unit to manage broadcasting program information; and a control unit to provide a broadcasting program list including information on at least one broadcasting program that overlaps an entry in the user schedule, wherein the broadcasting program list does not include information on broadcasting programs that do not overlap at least one entry in the user schedule.

According to another aspect of the present invention, there is provided a method of managing a user schedule in a terminal apparatus, the method including: providing an external schedule list including information on at least one entry of an external schedule, different from the user schedule, that overlaps an entry in the user schedule, wherein the external schedule list does not include information on entries of the external schedule that do not overlap at least one entry in the user schedule.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7A through 7C are diagrams illustrating screens for managing a user's schedule according to another embodiment of the present invention;

DETAILED DESCRIPTION OF THE EMBODIMENTS

Figure 1:
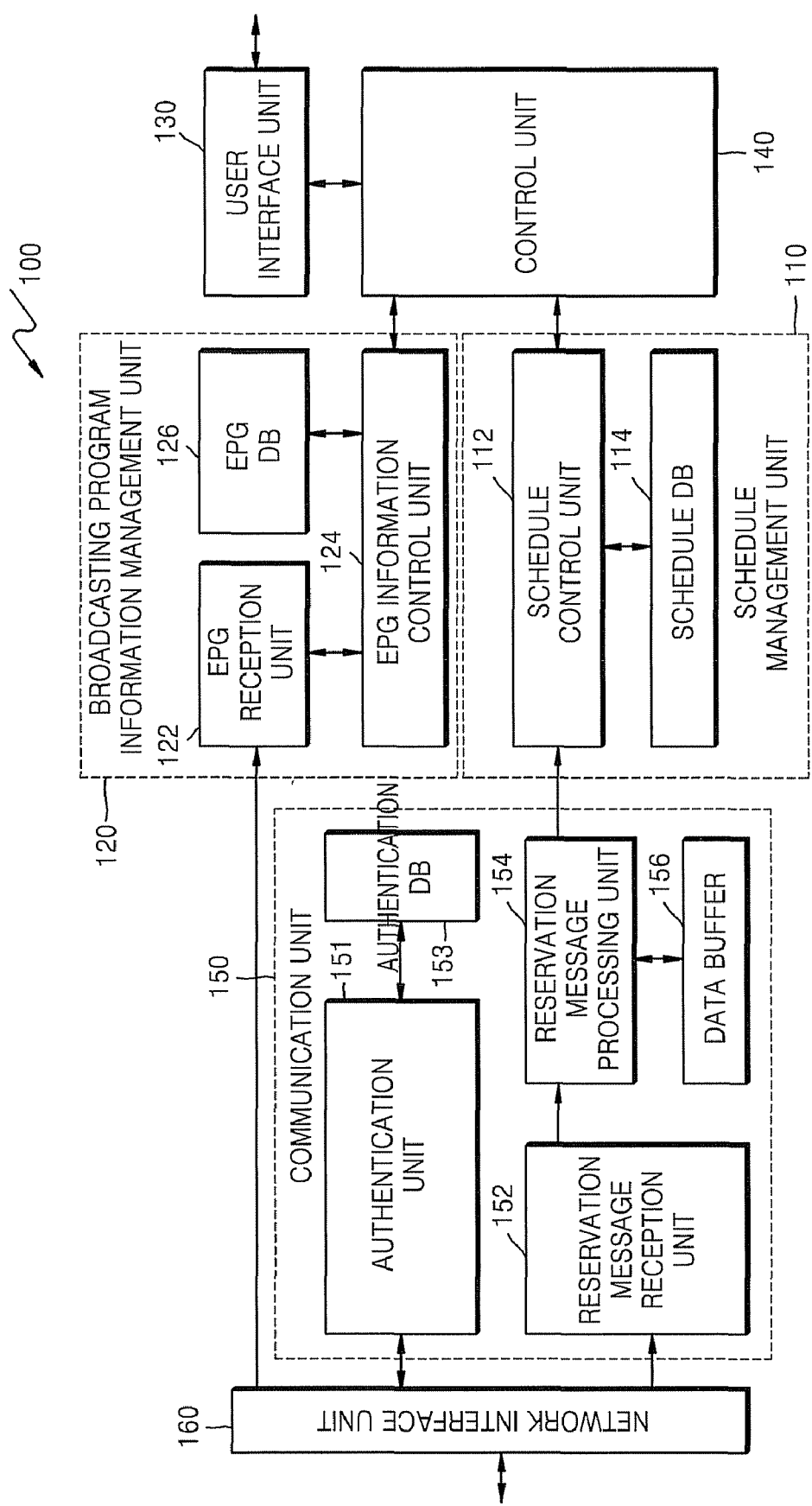
FIG. 1 is a block diagram illustrating a structure of an apparatus to manage a user's schedule according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a structure of an apparatus to manage a user's schedule 100 according to an embodiment of the present invention. The apparatus 100 is a user terminal apparatus that allows the user to manage the user's schedule while obtaining broadcasting program information or watching a broadcasting program. The apparatus 100 can be implemented as a mobile terminal, such as a personal digital assistant (PDA) or a mobile phone. The broadcasting program information is a schedule of television broadcasts utilized, for example, by an Internet protocol (IP) mobile television function of the apparatus 100.

Referring to FIG. 1, the apparatus 100 includes a schedule management unit 110, a broadcasting program information management unit 120, a user interface unit 130, a control unit 140, a communication unit 150, and a network interface unit 160.

The schedule management unit 110 manages the user's schedule and includes a schedule control unit 112 and a schedule database (DB) 114.

The schedule control unit 112 receives input information on the user's schedule from the user interface unit 130 and stores the information in the schedule DB 114. Furthermore, the schedule control unit 112 searches the schedule DB 114 and provides the user's schedule information to the control unit 140 according to a request for the information input through the user interface unit 130.

The control unit 140 controls data transmission and reception between each component of the apparatus 100. The control unit 140 forms a screen to provide the user's schedule retrieved from the schedule management unit 110 to the user.

The broadcasting program information management unit 120 is included in the apparatus 100 when the apparatus 100 provides broadcasting program information. That is, according to aspects of the present invention, the apparatus 100 does not necessarily include the broadcasting program information management unit 120 when the apparatus 100 does not provide broadcasting program information. The control unit 140 generates a broadcasting program list, including information on at least one broadcasting program that overlaps the user's schedule, and provides the list to the user. Also, the control unit 140 updates the broadcasting program list as necessary (for example, when the user's schedule changes).

The broadcasting program information management unit 120 includes an Electronic Program Guide (EPG) reception unit 122, an EPG information control unit 124, and an EPG database (DB) 126.

The EPG reception unit 122 receives, through the network interface unit 160, broadcasting program information from a communication network. The EPG reception unit 122 may receive the broadcasting program information transmitted through a broadcasting network. The EPG information control unit 124 stores the received broadcasting program information in the EPG DB 126. Furthermore, the EPG information control unit 124 provides the broadcasting program information to the control unit 140 according to a request from the user. Accordingly, the control unit 140 forms a screen to provide the retrieved broadcasting program information to the user.

The user interface unit 130 receives a users input signal and transfers the signal to the control unit 140. The control unit 140 controls the apparatus 100 according to the user's input signal.

For example, if a user's input signal to select an icon for updating the user's schedule according to a reservation message is received from the user interface unit 130, or if the reservation message is received from a service provider of a service message with which the user's schedule is set to be automatically updated, the control unit 140 determines whether the schedule included in the reservation message for the update overlaps the existing schedule of the user. If the schedule overlaps the existing schedule, the user is informed of the overlapping of the schedules. An operation to inform the user of the overlapping of the schedules may be performed in one or more of a variety of ways, including outputting a message to an output unit (not shown) of the apparatus 100, or vibrating the apparatus 100.

The communication unit 150 receives a reservation message from a service provider. The user may register a service registration with the service provider. That is, the reservation message can be received from the service provider when the user makes a reservation with the service provider through, for example, the Internet or a telephone call, or when cancellation of a reservation is registered. In the latter case, the reservation message, which is received when cancellation of a reservation is registered, includes information indicating that the reservation is cancelled.

Also, the communication unit 150 may perform an authentication process for a service provider to confirm whether the service provider is permitted to transmit a reservation message to the apparatus 100 and/or the user. If authenticated, the communication unit 150 receives the reservation message from the service provider.

The communication unit 150 includes an authentication unit 151, an authentication DB 153, a reservation message reception unit 152, a reservation message processing unit 154, and a data buffer 156. The authentication unit 151 and the authentication DB 153 perform the authentication process described above. The authentication message reception unit 152, the reservation message processing unit 154, and the data buffer 156 process a reservation message received from the service provider.

The authentication unit 151 accesses a server managed by a service provider through the network interface unit 170, receives authentication information received from the service provider, and searches the authentication DB 153 for the authentication information in order to determine whether the authentication information is in the authentication DB 153. If the authentication information is in the authentication DB 153, the authentication unit 151 permits a connection to a server of the service provider, and receives a reservation message from the service providing server.

The authentication process can be performed in any of a variety of ways. For example, if a request for authentication from a service provider is received, the apparatus 100 requests authentication information from the service provider. The authentication information may include an IP and access ID of the service provider. If the authentication information from the service provider is received, an authentication procedure is performed by using the authentication information. That is, it is first confirmed whether the IP of the service provider is registered as a permitted IP in the authentication DB 153. Then, it can be confirmed whether the access ID of the service provider is an access-permitted ID. If the authentication procedure is completed, the apparatus 100 transmits an authentication completion message to the service provider. Then, service data (including a reservation message) can be received from the service provider.

The reservation message reception unit 152 receives the reservation message from the service provider (i.e., a server run by the service provider). The reservation message processing unit 154 processes the reservation message and temporarily stores the reservation message in the data buffer 156. The control unit 140 controls information included in the temporarily stored reservation message to be transferred to the schedule management unit 110 and stored. If a reservation message from a predetermined service provider is set to be automatically stored, the information included in the reservation message may be stored directly in the user's schedule DB 114 of the schedule management unit 110.

Also, the control unit 140 transfers information included in the reservation message, selected according to a user's input signal, to the schedule management unit 110. That is, if the control unit 140 outputs the reservation message and the user selects information in the contents of the reservation message via the user interface unit 130, the selected information may be stored in the user's schedule DB 114.

The control unit 140 transfers information included in the reservation message to the schedule management unit 110, and controls the schedule management unit 110 to apply the information to the user's schedule, thereby updating the user's schedule. The control unit 140 forms a screen to provide the updated user's schedule and outputs the screen to the output unit (not shown).

Information included in the reservation message may include at least one of a service reservation place, a service reservation time, a number of persons for the service reservation, a server address of the service provider, and an icon for voice over Internet protocol (VoIP). Also, the information included in the reservation message may further include an advertisement message of the service provider. It is understood that in the present specification, reference to an item or component including "at least one of" x, y, and z indicates the item or component including either (x), (x,y), (x,z), (x,y,z), (y), (y,z), or (z).

Meanwhile, the control unit 140 may provide reservation message information, including a method to perform a control operation related to the reservation message after receiving a user's input. The method to perform the control operation may implement at least one of an icon for updating the user's schedule with the reservation message, an icon for providing a user's schedule update list, an icon with which the user adds the service provider providing the reservation message to a list of favorites, an icon for providing the favorite list, an icon for storing the reservation message, and an icon for providing a list of stored reservation messages (i.e., a reservation message list).

Each of the user's schedule update list, the favorite list, and the reservation message list may include an icon to set a favorite for each service provider. The control unit 140 may provide a reservation message together with an automatic update setting icon to prepare the reservation message transmitted by each service provider so that updating according to the reservation message can be automatically performed.

A case where a user registers a service reservation with a service provider is described above. However, it is understood that aspects of the present invention can also be implemented in a case of canceling a service reservation, whereby the apparatus 100 can manage the user's schedule so that the contents of the reservation cancellation are reflected in the user's schedule, by using a message provided by a service provider.

Figure 2A:
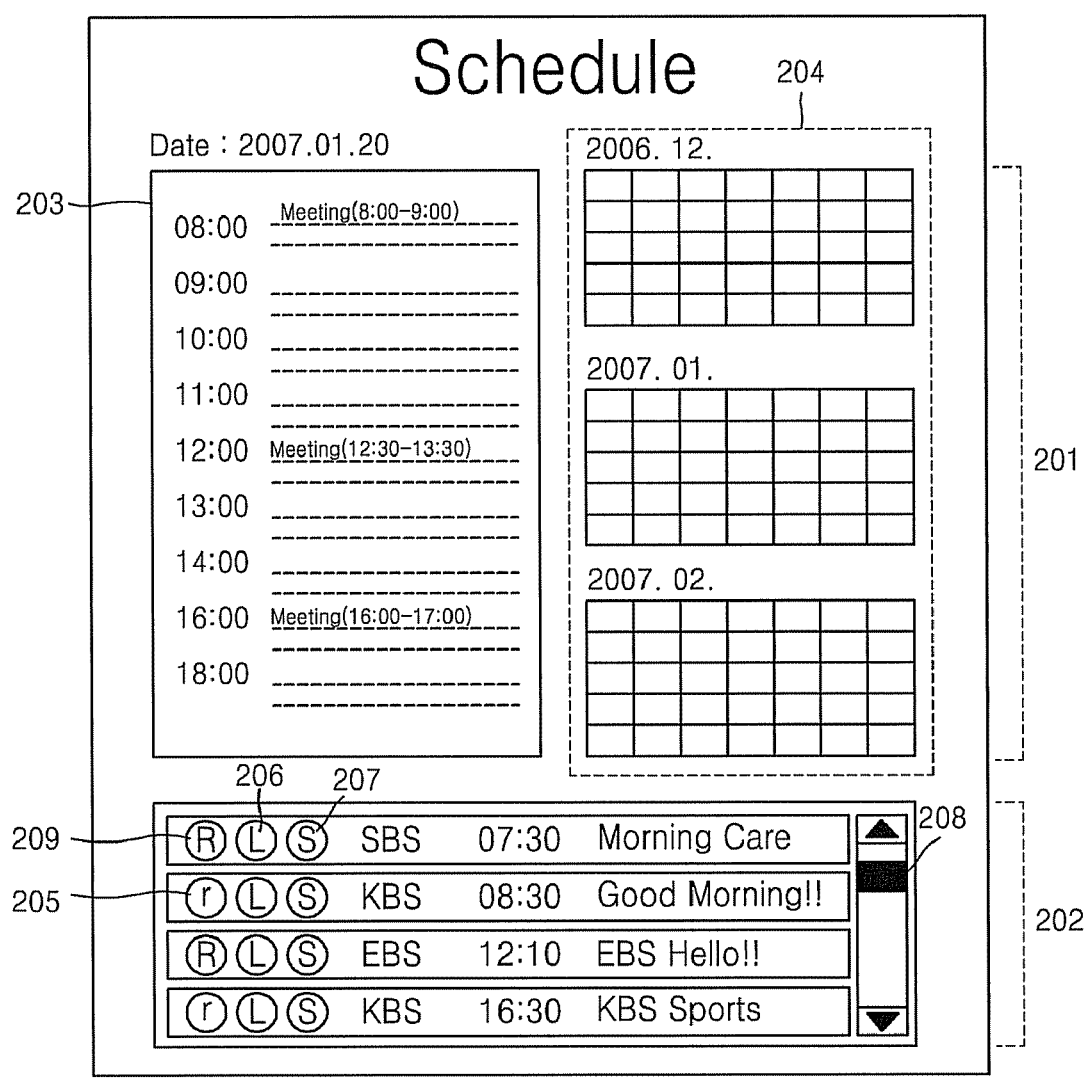
FIGS. 2A and 2B are diagrams illustrating screens for managing a user's schedule according to an embodiment of the present invention.
Figure 2B:
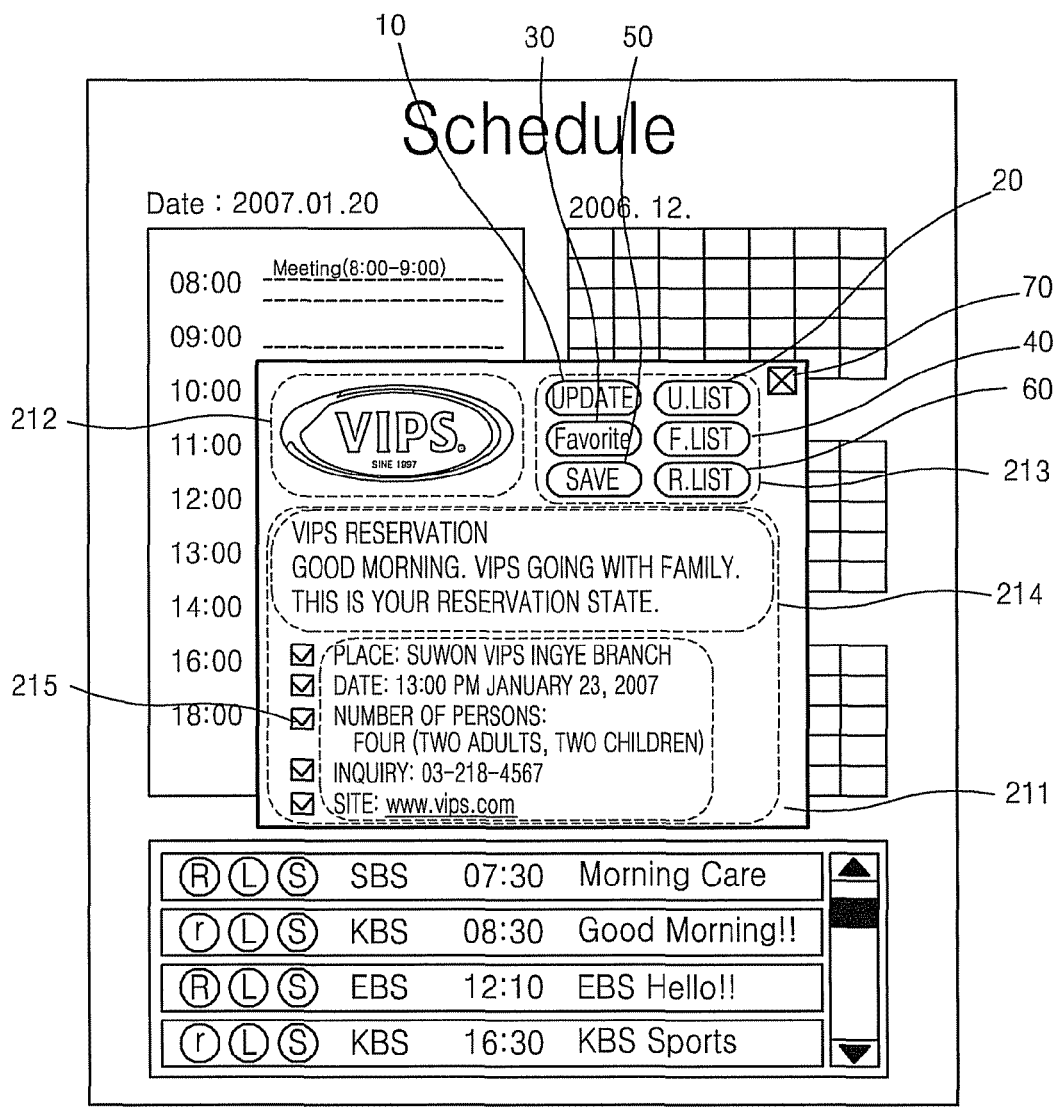

FIGS. 2A and 2B are diagrams illustrating screens for managing a user's schedule according to an embodiment of the present invention. The screen illustrated in FIG. 2A is a screen that appears when a program for managing a user's schedule is executed in a terminal apparatus. The screen illustrated in FIG. 2A includes a part 201 showing a user's schedule that includes the user's daily schedule table 203 and the user's monthly schedule table 204, and a broadcasting program list 202, which includes information on broadcasting programs that overlap the user's daily schedule. The user can position a cursor at the user's daily schedule table 203 and then update the schedule or go to a future or previous day's schedule.

Whenever the user's daily schedule changes, the broadcasting program list 202 changes, in real time, accordingly. That is, if a date or time changes in the user's daily schedule table 203 in the part 201 showing the user's schedule, a list of broadcasting programs corresponding to the changed date or time is displayed in the block 202.

The monthly schedule table 204 shows three months, including a current month, a previous month, and a next month. However, it is understood that according to other aspects of the present invention, the monthly schedule table 204 may show more than three months, less than three months (such as a current month and a next month), or different months (such as a current month and a next two months). If the user selects a specific day in the monthly schedule table 204 (which may be constructed as a calendar), the user's schedule table for the specific day is displayed in the daily schedule table 203 so that the user's schedule can be edited.

The broadcasting program list 202 includes basic information of a broadcasting program having a broadcasting time that overlaps the user's schedule. Referring to FIG. 2A, the basic information (i.e., broadcasting program information) may include one or more of the broadcasting channel of each broadcasting program, the broadcasting times, and broadcasting program titles. According to aspects of the present invention, each broadcasting program information item includes a method for performing a control operation according to a user's input, and is provided so that the user can execute a control operation related to the broadcasting program. For example, the method for performing a control operation according to a user's input may implement an icon that is displayed together with the broadcasting program list. In FIG. 2A, icons "R" 209, "L" 206, and "S" 207 are provided as such icons.

The R icon 209 is a recording button to set a recording operation and shows the state of a recording operation as being set. Before recording begins, the user can set the recording operation, or cancel the recording operation by using the R icon 204. During recording, the user can stop the recording by using the R icon 204. However, in a state in which the recording has been finished, the R icon 204 is displayed with a changed color (or another distinguishing characteristic). An icon "r" 205 is a recording button to set a recording operation, and shows a state in which no recording operation is set. It is understood that different methods other than a capitalized or lowercase "r" letter can be used to indicate a state of a recording operation. For example, a different letter can be used, or different colors can be used to indicate the state of the recording operation (for example, a red color can be used to indicate a state in which the recording operation is set, and a green color can be used to indicate a state in which the recording operation is not set).

The L icon 206 is a button to switch to a recording reservation list screen. The S icon 207 indicates whether the user's schedule overlaps the broadcasting time of a broadcasting program. It is understood that different letters or other indicative characteristics (such as numbers or colors) may be used for the buttons.

When a list of broadcasting programs overlapping the user's schedule is too long for a screen, a scroll bar 208 allows the screen to be scrolled upward or downward so that the user can view the list.

FIG. 2B shows a reservation message screen that is displayed by an apparatus for managing a user's schedule after receiving a reservation message from a service provider according to an embodiment of the present invention. Referring to FIG. 2B, a reservation message window 211 informing about the receipt of the reservation message displays a message that the service provider transmits to the apparatus. The format of the reservation message window 211 may vary with respect to different service providers. For example, a service provider may include, on its home page, applications capable of providing a variety of types of reservation messages. Therefore, if the user selects and downloads a reservation message providing application of a desired type, the apparatus can display a received reservation message in a form desired by the user. However, it is understood that the format of the reservation message window 211 may be set according to an application included in the apparatus or downloaded from a third party.

The reservation message window 211 includes a part 212 showing a service provider, a part 213 providing icons (i.e., buttons) corresponding to control operations related to a reservation message, and a message providing part 214 illustrating a message provided by the service provider. In the part 212 showing the service provider, an image or logo of the service provider, moving picture advertisements or link information to move to the home page of the service provider, and/or a textual display of a name of the service provider may be provided.

The part providing icons 213 includes an update icon (UPDATE) 10, an update list icon (U.LIST) 20, a favorite icon (FAVORITE) 30, a favorite list icon (F.LIST) 40, a save icon (SAVE) 50, and a reservation list icon (R.LIST) 60.

The update icon 10 is a button for updating the user's schedule with a reservation schedule, message, or time provided by the service provider. If the update icon 10 is clicked, the user's schedule is updated with the reservation time and contents included in a reservation message, and a reservation message list is updated. According to aspects of the present invention, the update icon 10 displayed when updating of the user's schedule is completed can be distinguished from the update icon 10 be displayed when the user's schedule is yet to be updated by using different colors, different fonts, or different symbols, although not limited thereto.

The update list icon 20 is a button for viewing the updated reservation message list. The favorite icon 30 is a button for setting a service provider that the user frequently uses or likes in the apparatus for managing a user's schedule as a favorite. According to aspects of the present invention, the favorite icon 20 to be displayed when the favorite is set can be distinguished from the favorite icon 20 to be displayed when the favorite is yet to be set by using different colors, different fonts, or different symbols, although not limited thereto. Even when the user does not press the update icon 10, information included in a reservation message that is received from a service provider set as a favorite may be automatically added to the user's schedule and managed.

The favorite list icon 40 is a button for viewing a list of service providers set as favorites by the user. The save icon 50 is a button for storing a reservation message received from a service provider. The reservation list icon 60 is a button for viewing a reservation message list stored by the user.

In the message providing part 214, selection icons 215 for selecting stored contents are provided. By using each selection icon 215, the user can select only desired items in the contents of the message, thereby storing or updating the items. However, it is understood that according to other aspects, different methods can be used to select desired items in the contents of the message (for example, moving a cursor over the desired object and selecting the desired object)

In the message providing part 214, such information as a place, date, and time of a reservation of the user is provided. Furthermore, detailed information (such as whether to use a parking lot, whether to use a discount coupon, a reserved menu list in the case where the service provider is a food providing business, or a reason for visiting a hospital (vaccination, X-ray checking, etc.) in the case where the service provider is a hospital) may also be provided. Moreover, link information to open the home page of the service provider or an icon to place a telephone call (such as an Internet telephone call) to the service provider may be included. Also, greetings of the service provider or advertisements can be included and provided as illustrated in FIG. 2B.

Figure 3A:
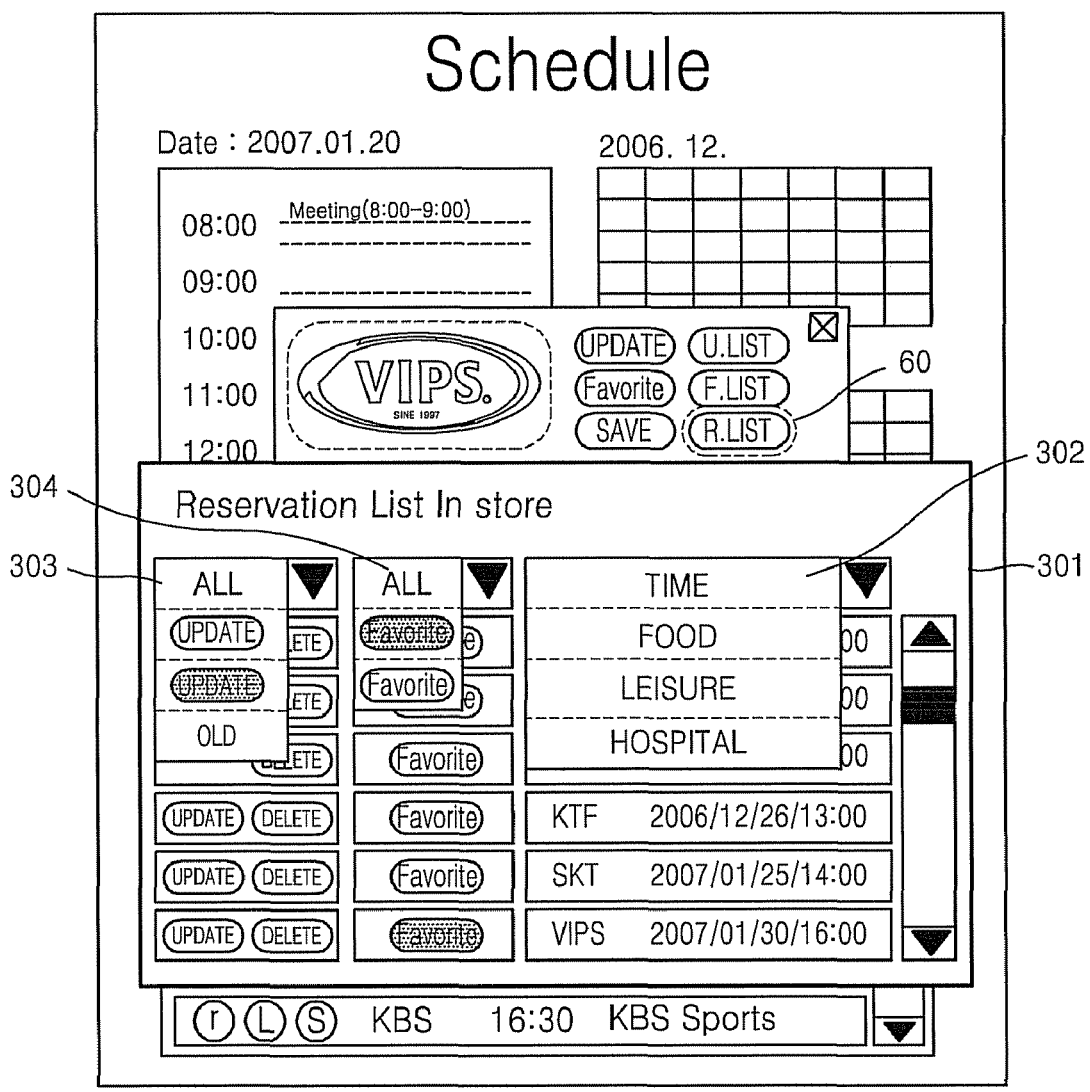
FIGS. 3A through 3C are diagrams illustrating screens which are output when list related icons are selected on the screen illustrated in FIG. 2B according to an embodiment of the present invention.
Figure 3B:
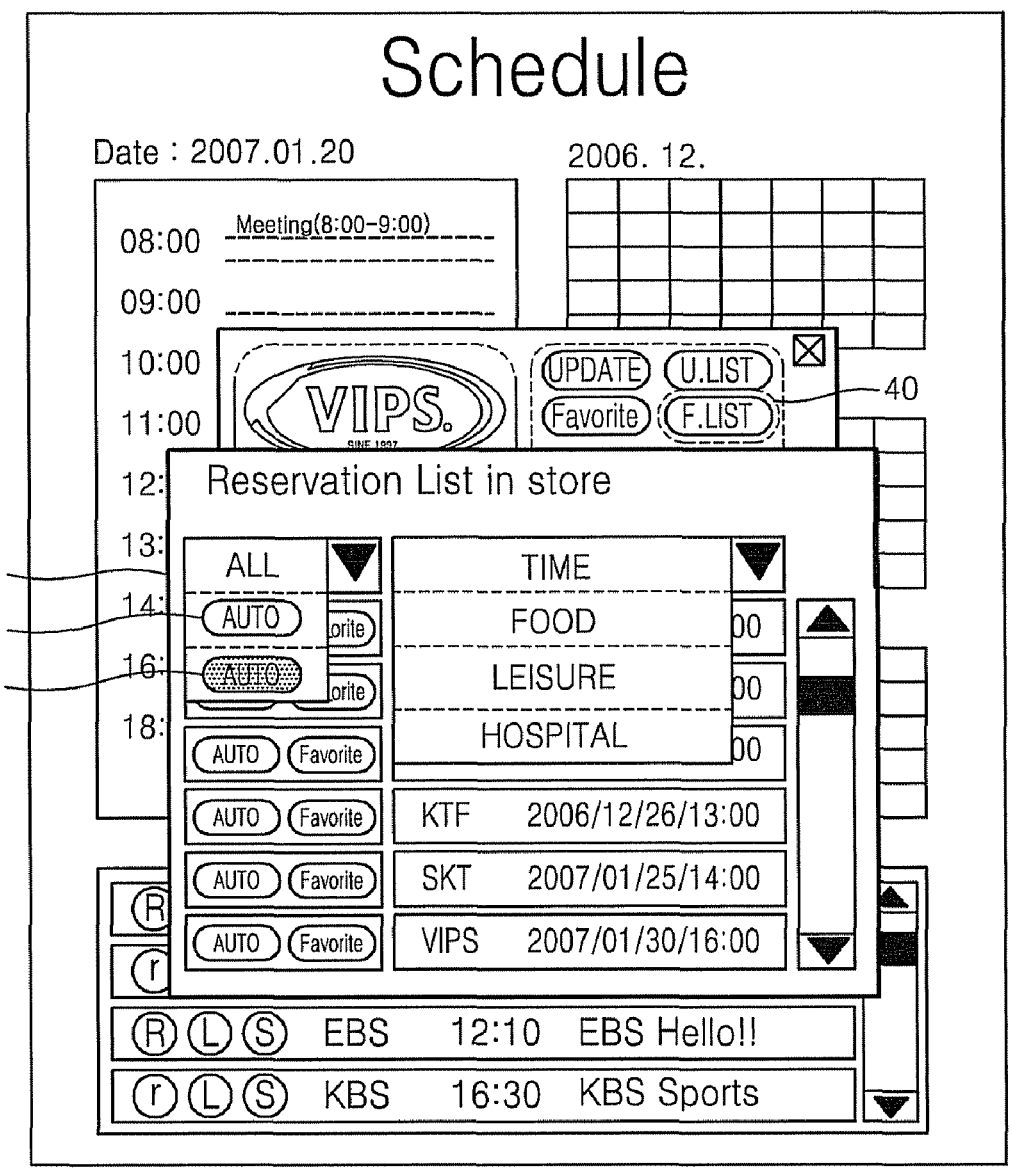
Figure 3C:
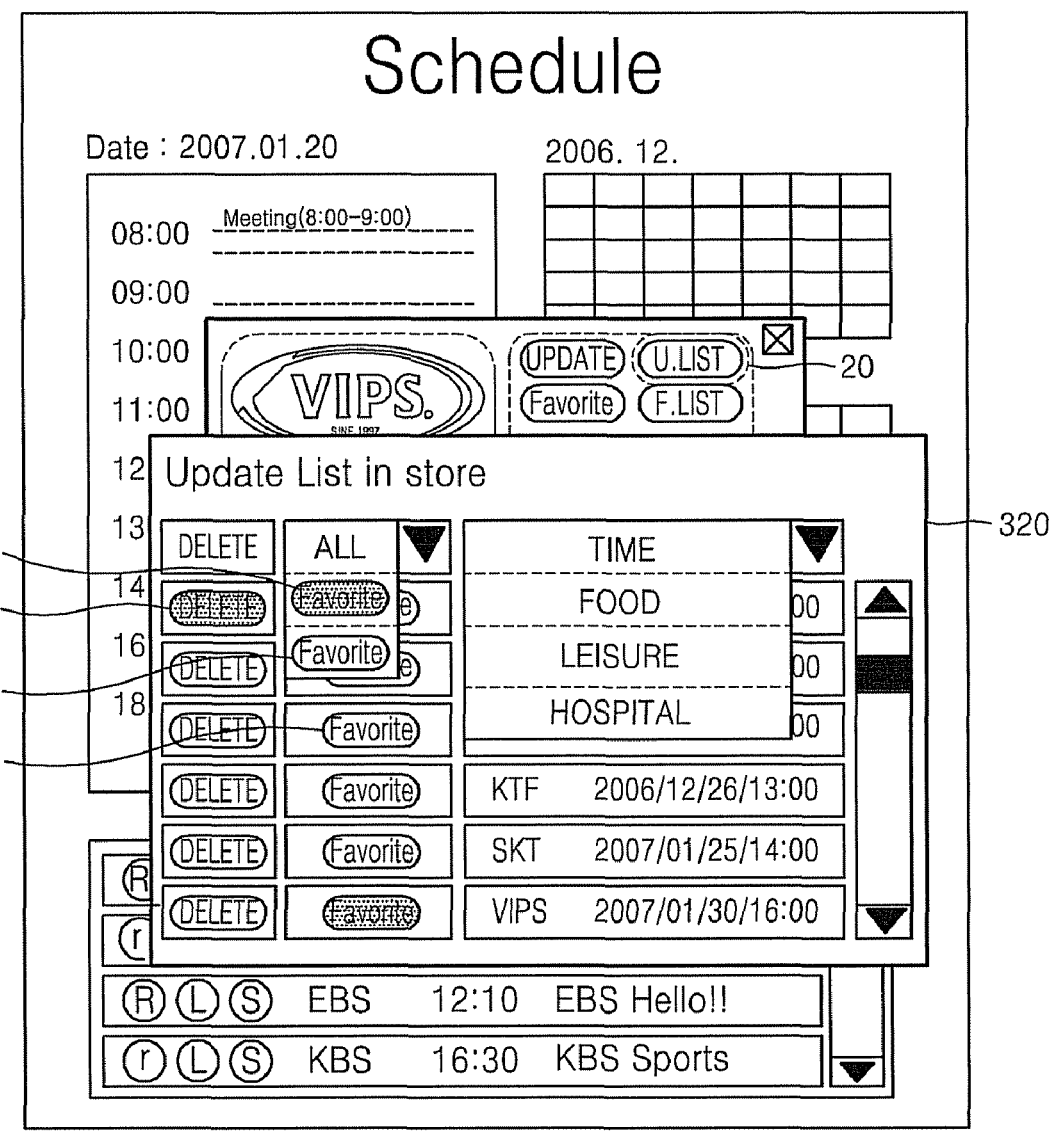

FIGS. 3A through 3C are diagrams illustrating screens that are output when list related icons 20, 40, 60 are selected on the screen illustrated in FIG. 2B according to an embodiment of the present invention.

FIG. 3A is a screen that is output when the reservation list icon 60 is selected. If the reservation list icon 60 is selected, a reservation list window 301 is output. The reservation list window 301 includes a list 302 for sorting a reservation message list according to categories to which the service providers that transmit the reservation messages belong, a list 303 for sorting a reservation message list based on whether a reservation message included in the reservation message list is updated (as described above with reference to the update icon 10 illustrated in FIG. 2B), and a list 304 for sorting a reservation message list based on whether a reservation message included in the reservation message list is set as a favorite.

In the list 303 for sorting the reservation message list based on whether a reservation message is updated, the items of the list 303 may be distinguished by using different colors for each icon. In the list 303, an OLD icon is a button for filtering and displaying reservation messages whose reservation times have already elapsed, and UPDATE icons are buttons for filtering and displaying reservation messages that have or have not been updated. If the user selects the icon indicating updated reservation messages in the list 303, only the reservation items corresponding to reservation messages in which updating is completed are filtered and displayed. In contrast, if the user selects the icon indicating reservation messages in the list 303 that are not updated, only the reservation items corresponding to reservation messages in which updating is yet to be performed are filtered and displayed.

Also, in the list 304 for sorting the reservation message list based on whether a reservation message (or corresponding service provider) is set as a favorite, the items of the list 304 may be distinguished by using different colors for each icon. If the user selects the icon indicating reservation messages (or corresponding service providers) that are set as favorites, only the reservation items corresponding to reservation messages (or service providers) that are set as favorites are filtered and displayed. In contrast, if the user selects the icon indicating reservation messages (or corresponding service providers) that are not set as favorites, only the reservation items corresponding to reservation messages (or service providers) that are not set as favorites are filtered and displayed.

FIG. 3B is a screen that is output when the favorite list icon 40 on the screen illustrated in FIG. 2B is selected. If the favorite list icon 40 is selected, a favorite list window 310 is output that displays a list of service providers set as favorites. The favorite list window 310 can be implemented so that the user can cancel the favorite setting of a service provider.

AUTO icons 311 and 312 (which may be distinguished by using different colors) control whether the user's schedule is to be automatically updated when a message arrives. If the user's schedule is set to be automatically updated, when a reservation message of a service provider that is set as a favorite arrives, the user's schedule information is automatically updated with the information of the reservation message.

FIG. 3C is a screen that is output when the update list icon 20 is selected. If the update list icon 20 is selected, an update list window 320 is output. The update list window 320 includes a delete icon (DELETE) 323 through which the user can directly delete a specified reservation message. Also, according to the colors (or other distinguishing characteristic) of the favorite icons 321 and 322, the user can confirm whether a corresponding service provider of a reservation item is set as a favorite. By clicking on a favorite icon 324 for a specified reservation item (or reservation message), the corresponding service provider of the reservation item can be set as a favorite or a previous setting as a favorite can be cancelled.

Figure 4A:
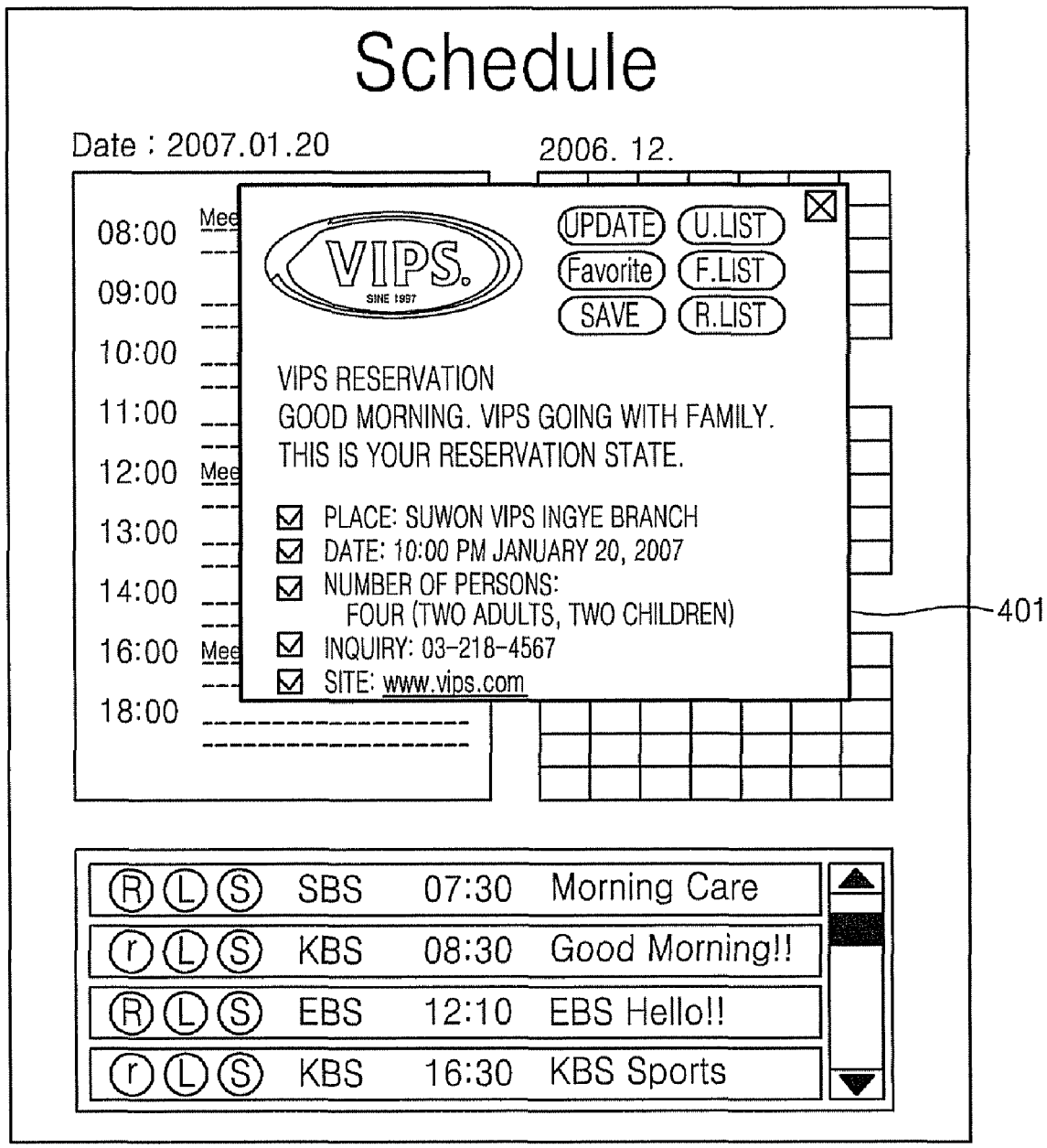
FIGS. 4A and 4B are diagrams illustrating screens for managing a user's schedule according to another embodiment of the present invention.
Figure 4B:
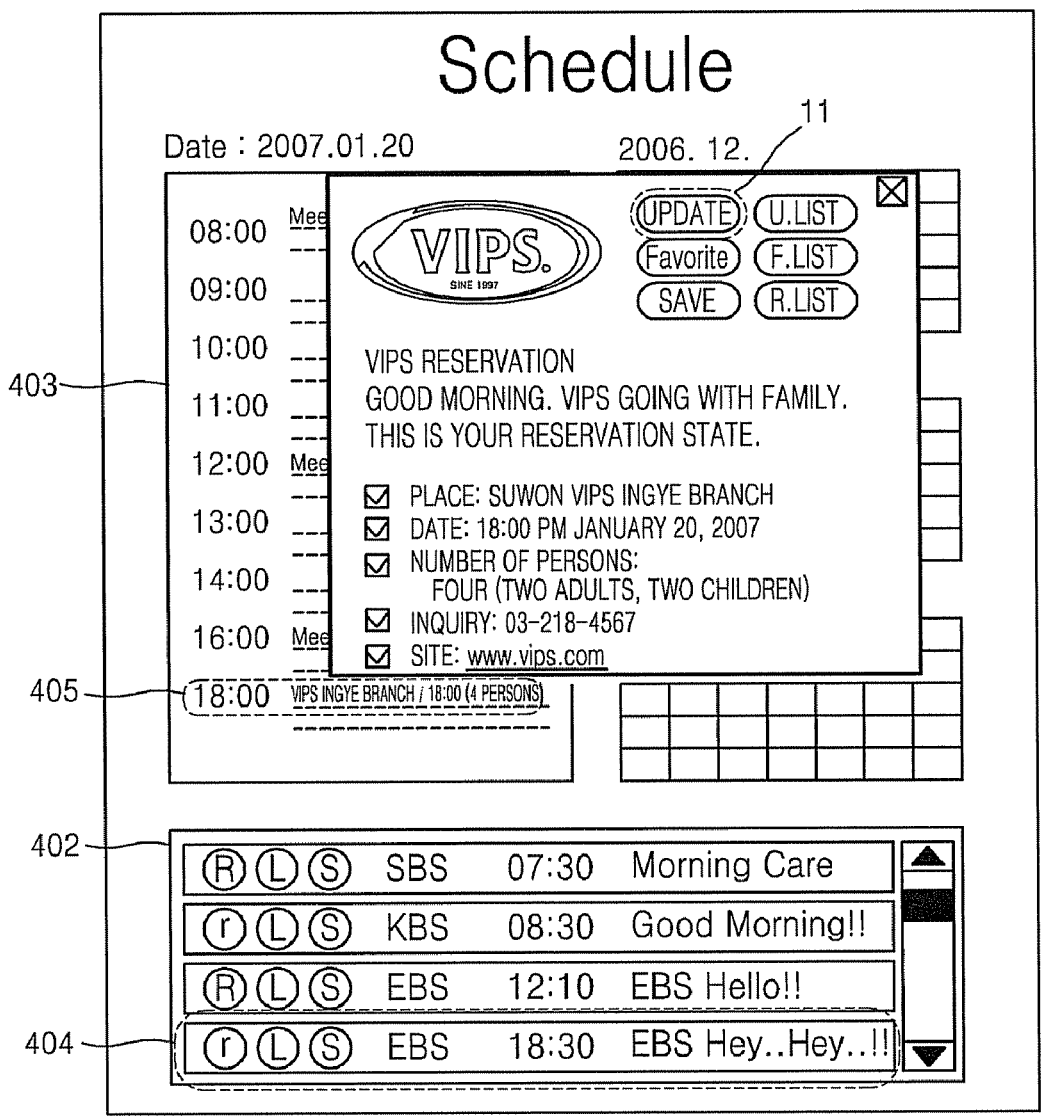

FIGS. 4A and 4B are diagrams illustrating screens for managing a user's schedule according to another embodiment of the present invention. FIG. 4A illustrates a screen in a case where the user's schedule does not overlap times included in a reservation message 401. FIG. 4B illustrates updating of the user's schedule and the broadcasting program list when an update icon 10 is selected in the screen illustrated in FIG. 4A according to an embodiment of the present invention.

Referring to FIG. 4B, if the update icon 11 is selected and the times included in the reservation message do not overlap the user's schedule (as illustrated), the user's schedule is updated as indicated by reference number 405 in the daily user's schedule table 403. Furthermore, in order to provide a list of broadcasting programs that overlap the updated schedule, the broadcasting program list 402 is updated as indicated by reference number 404.

Figure 5A:
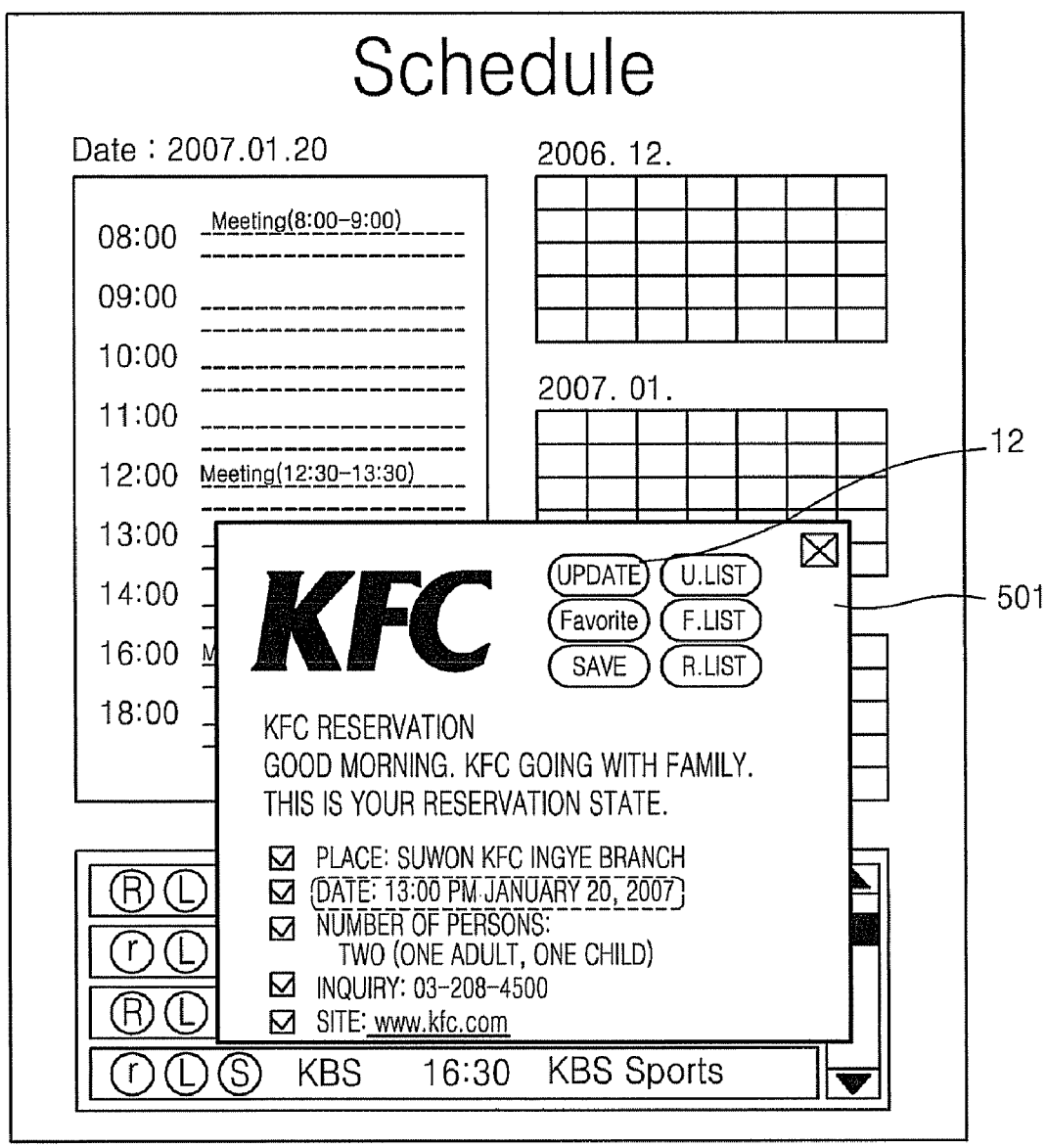
FIGS. 5A through 5C are diagrams illustrating screens for managing a user's schedule according to another embodiment of the present invention.
Figure 5B:
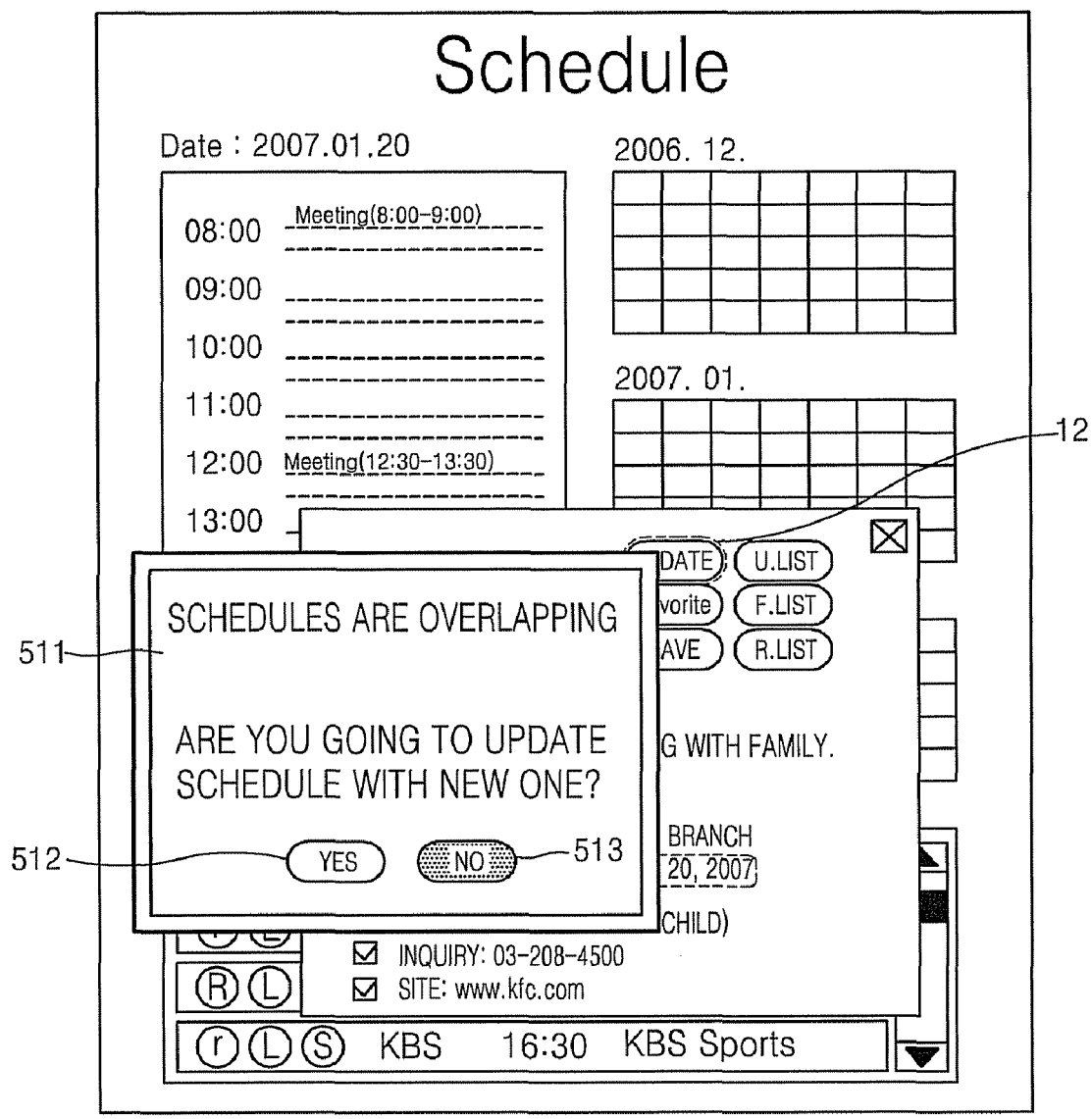
Figure 5C:
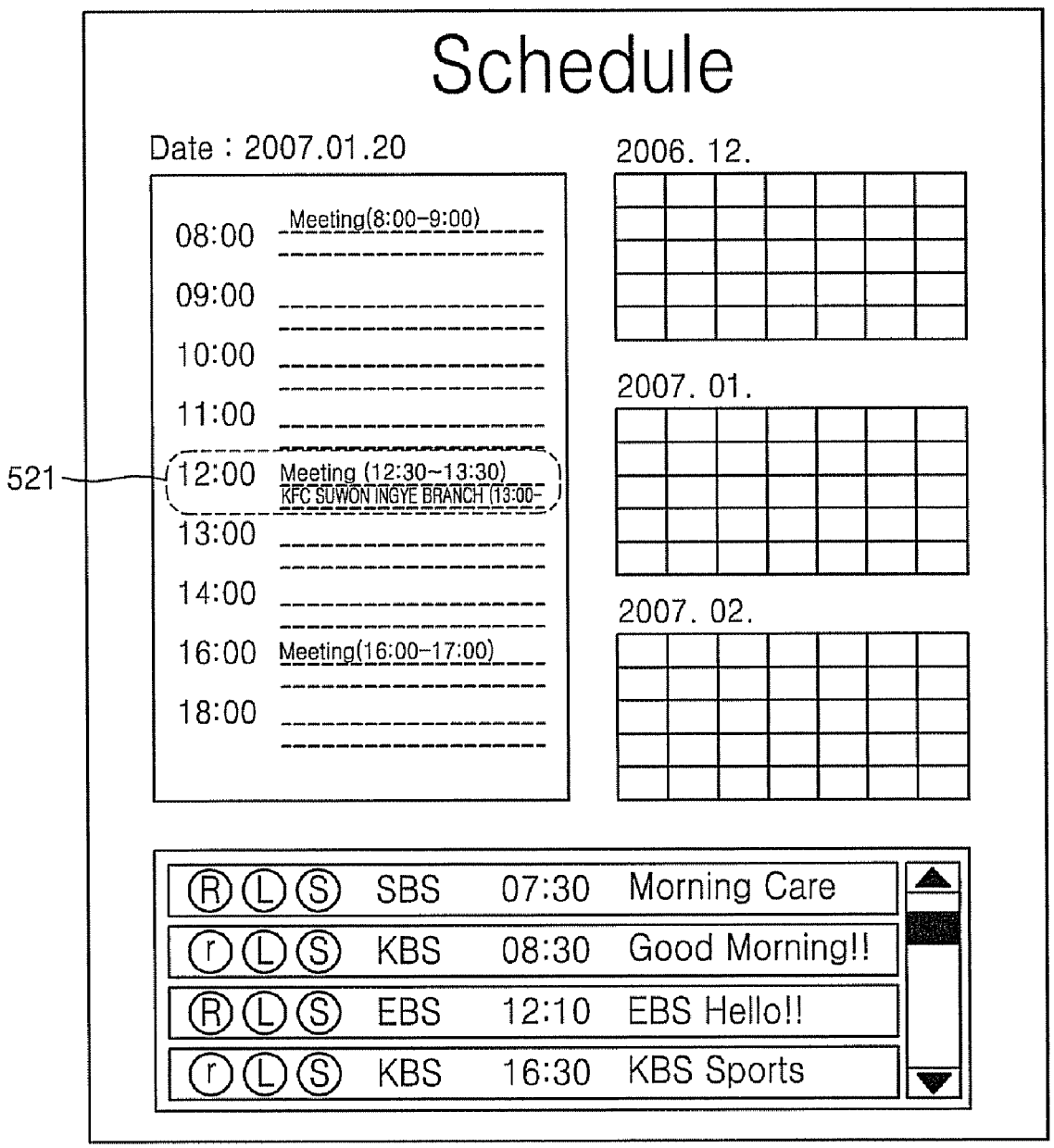

FIGS. 5A through 5C are diagrams illustrating screens for managing a user's schedule according to another embodiment of the present invention. FIG. 5A illustrates a screen in a case where the user's schedule overlaps times included in a reservation message. FIG. 5B illustrates a screen that is output when the user selects an update icon 10 in a reservation message window 501 illustrated in FIG. 5A. FIG. 5C illustrates a screen that is output when the user chooses to update the schedule despite the overlapping times.

If the user selects the update icon 12 in the reservation message window 501 illustrated in FIG. 5A, a message window 511 is output indicating that the times included in the reservation message overlap the user's schedule (as illustrated in FIG. 5B), thereby informing the user of the overlapping of the schedule. Together with the outputting of the message window 511, the user may be alerted to the overlapping of the schedule by other methods, such as a vibration or a sound.

If the Yes icon 512 in the message window 511 is selected, the user's schedule is updated with the contents of the reservation message (as illustrated in FIG. 5C). If the No icon 513 in the message window 511 is selected, the contents of the reservation message are not reflected in the user's schedule.

After the user is alerted to the overlapping of the schedule, updating may be performed such that an entry in the schedule overlapping an existing entry in the schedule can be additionally included as indicated by reference number 521 illustrated in FIG. 5C. The entry that is additionally included may be expressed distinctively by letters of a different color (or other distinguishing characteristic, such as font size or style) from the color of the existing entry. It is understood that according to other aspects, if the user chooses to update the schedule with the new entry, the existing entry may be removed or modified such that no overlapping exists. Alternatively, the new entry may be modified such that no overlapping exists. In the case of a modified or removed entry, the corresponding service provider may be notified of the modification to or removal of the reservation time.

Figure 6A:
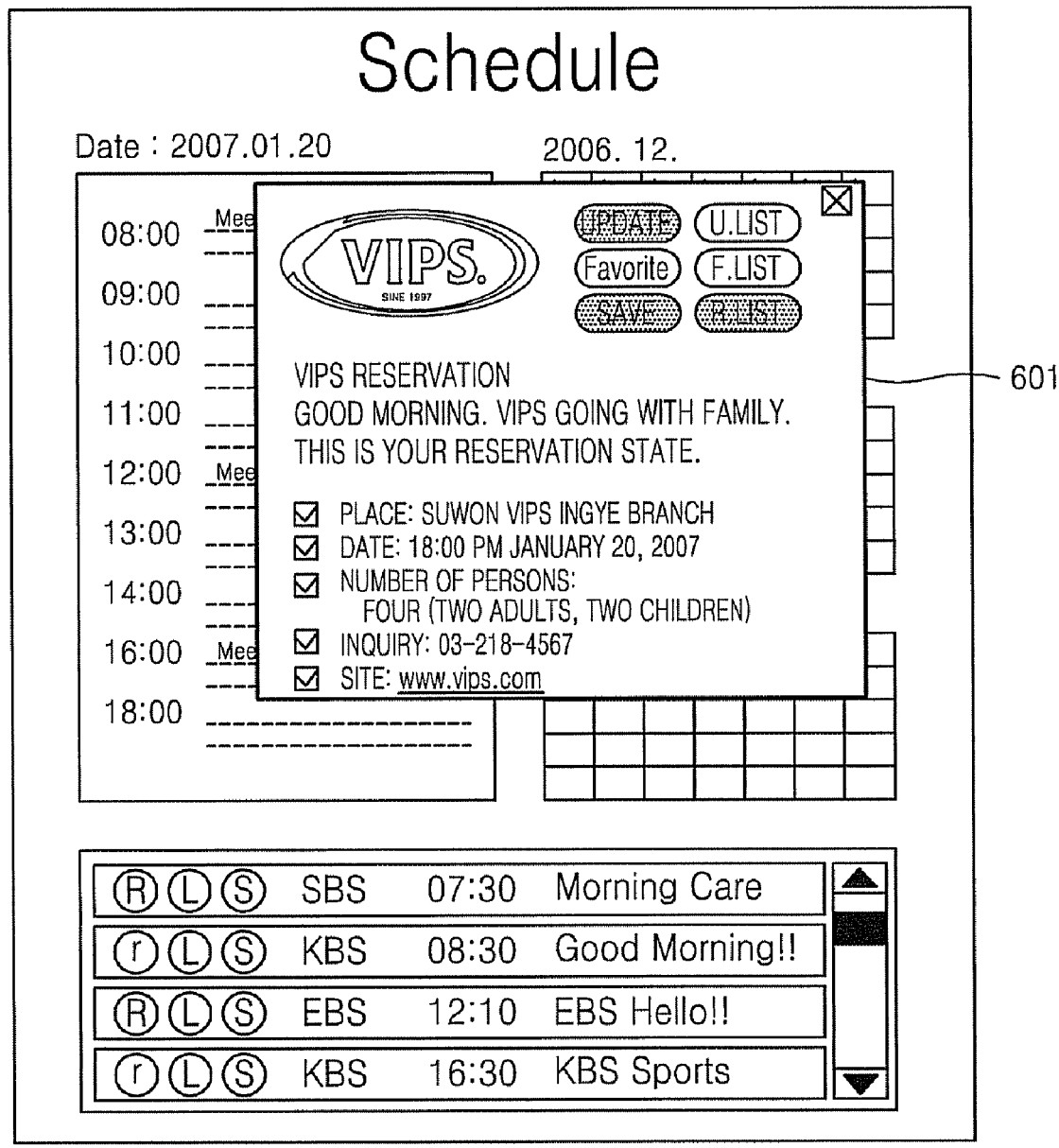
FIGS. 6A through 6C are diagrams illustrating screens for managing a user's schedule according to another embodiment of the present invention.
Figure 6B:
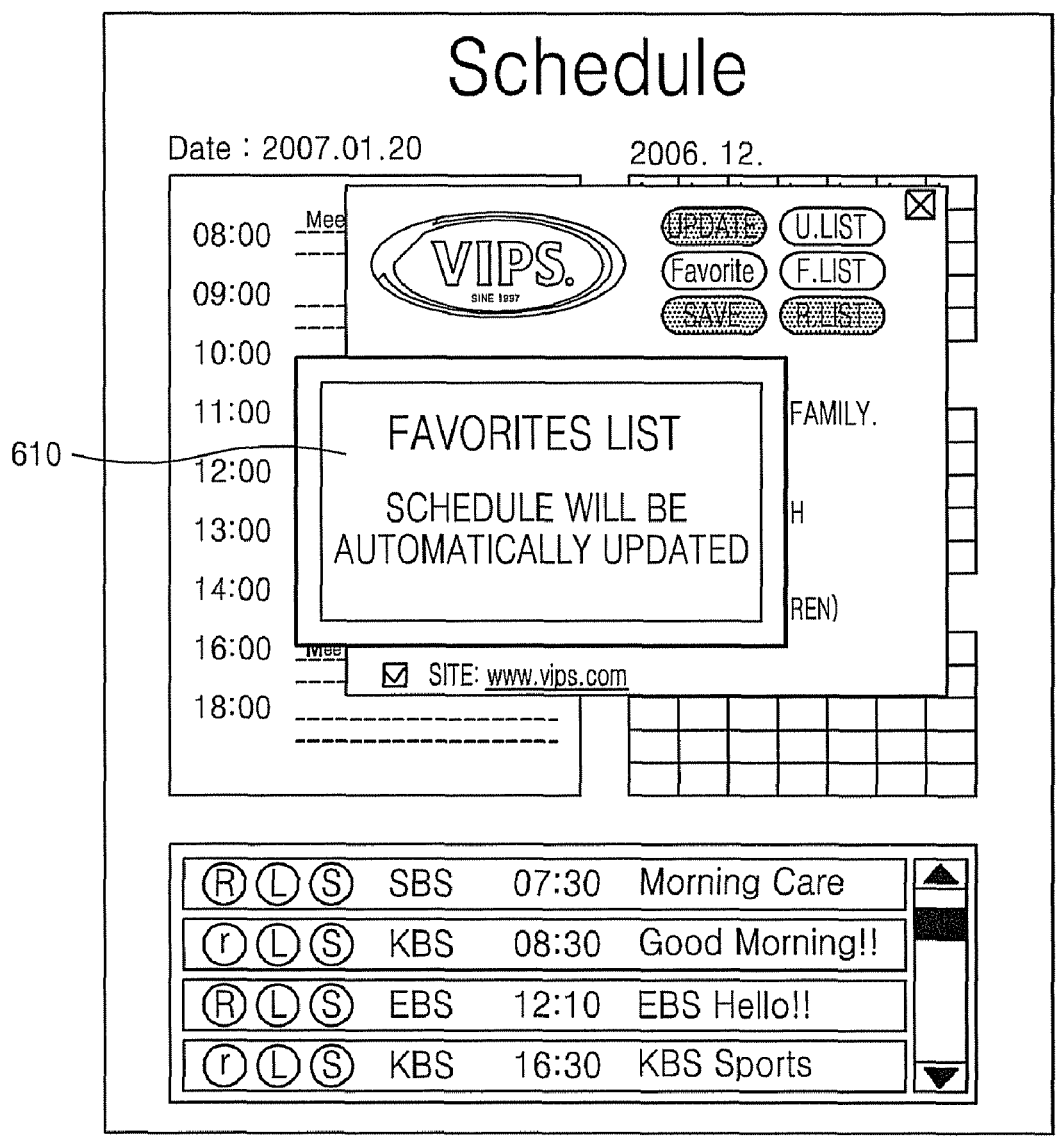
Figure 6C:
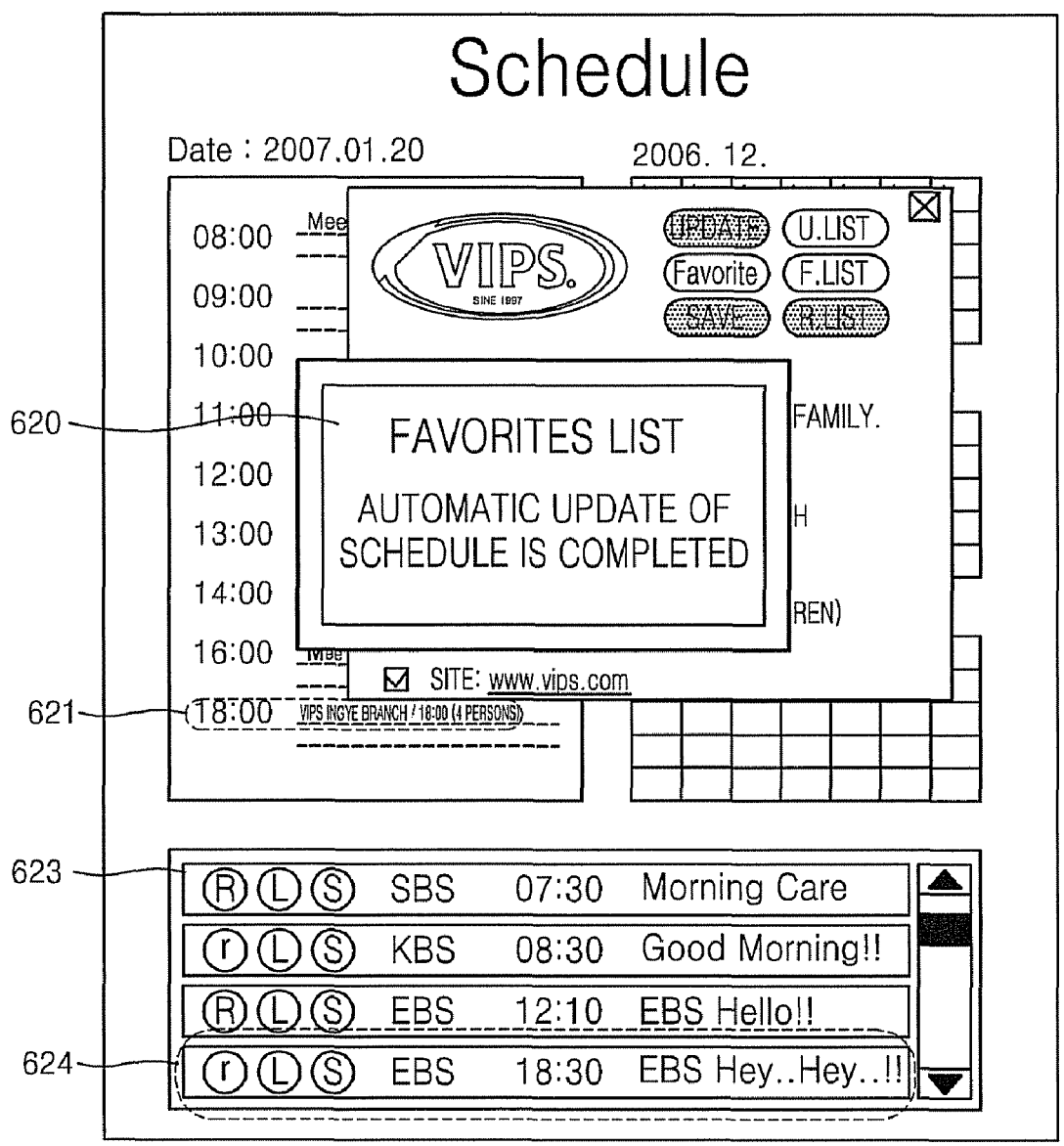

FIGS. 6A through 6C are diagrams illustrating screens for managing a user's schedule according to another embodiment of the present invention. FIGS. 6A through 6C illustrate screens in which a service provider is registered in a favorite list and the user's schedule is automatically updated upon reception of a reservation message. Once a reservation message is received by an apparatus for managing a user's schedule, it is first determined whether the corresponding service provider is registered as a favorite by searching a list of favorite service providers (via a screen such as the favorite list window 310 illustrated in FIG. 3B).

FIGS. 6A through 6C illustrate screens in a case where the user's schedule does not overlap the contents of a reservation message. If the reservation message is transmitted and a reservation message window 601 is provided as illustrated in FIG. 6A, it is first determined whether the reservation message is received from a service provider that is registered as a favorite. If the service provider is included in the favorites list, the automatic schedule updating is performed.

An automatic update message window 610 (illustrated in FIG. 6B) indicates that the automatic schedule updating is proceeding. It is understood that according to other aspects, the message window 610 is not displayed. When the automatic schedule updating is completed, a completion message 620 (illustrated in FIG. 6C) is output. The automatic schedule updating completion message window 620 can be closed by the user.

As illustrated in FIG. 6C, the user's schedule is updated in accordance with a time of the reservation message, as indicated by reference number 621. The broadcasting program list 623 is also automatically updated in order to reflect the broadcasting programs overlapping the updated user's schedule as indicated by reference number 624.

Figure 7B:
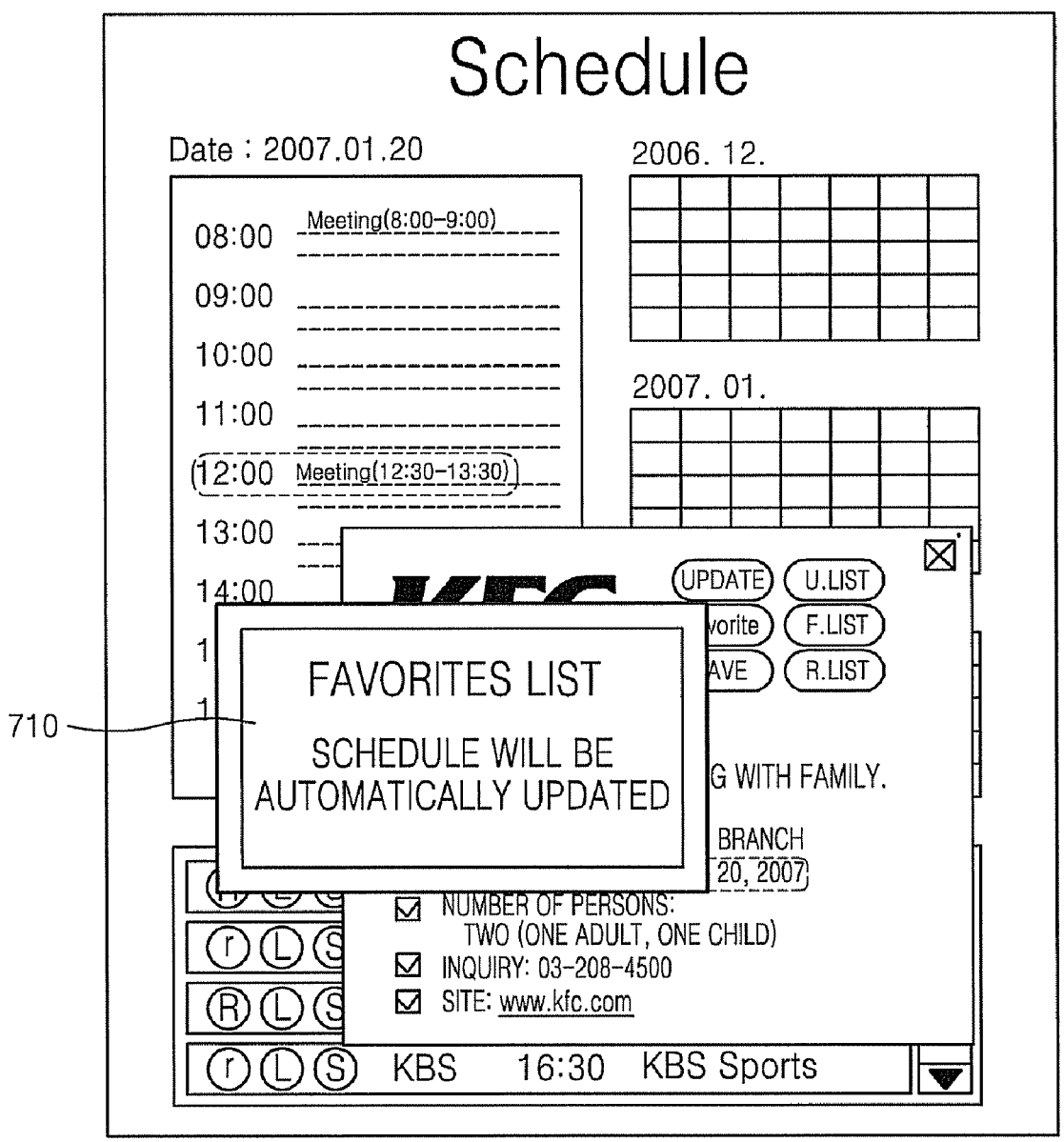
Figure 7C:
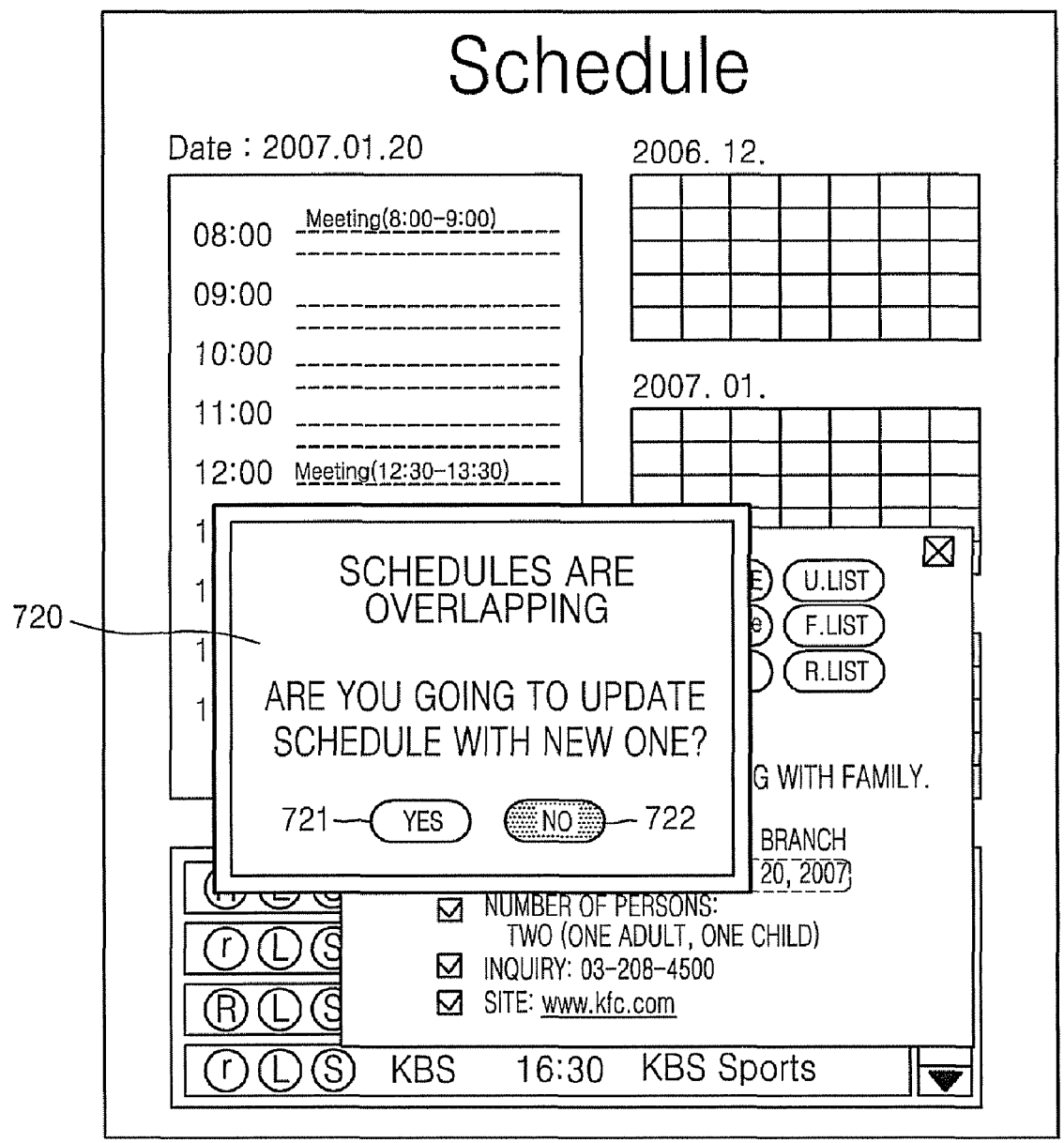

FIGS. 7A through 7C are diagrams illustrating screens for managing a user's schedule according to another embodiment of the present invention. FIGS. 7A through 7C illustrate a case where the user's schedule overlaps the schedule included in the contents of a reservation message when automatic updating is set.

As illustrated in FIG. 7A, once the reservation message 701 is received, it is determined whether the reservation message is received from a service provider that is registered in the favorites list. If the reservation message is received from a service provider registered in the favorite list, automatic schedule updating is performed. Accordingly, as illustrated in FIG. 7B, a message window 710 indicating that the schedule is being automatically updated is output. It is understood that according to other aspects, the message window 710 is not displayed.

While the schedule is automatically updated, if the user has an existing entry in the schedule at a time for which the schedule is being automatically updated, a message window 720 indicating that the schedules (i.e., entries) are overlapping is output, as illustrated in FIG. 7C.

If the user selects the "YES" icon 721 in the message window 720 indicating that the schedules are overlapping, the user's schedule is updated with the contents of the reservation message. That is, the contents of the reservation message (i.e., a new entry) are added to the user's schedule list. If the user selects the "NO" icon 722 in the message window 720, the contents of the reservation message are not reflected in the user's schedule. It is understood that according to other aspects, if the user chooses to update the schedule with the new entry, the existing entry may be removed or modified such that no overlapping exists. Alternatively, the new entry may be modified such that no overlapping exists. In the case of a modified or removed entry, the corresponding service provider may be notified of the modification to or removal of the reservation time.

Figure 8:
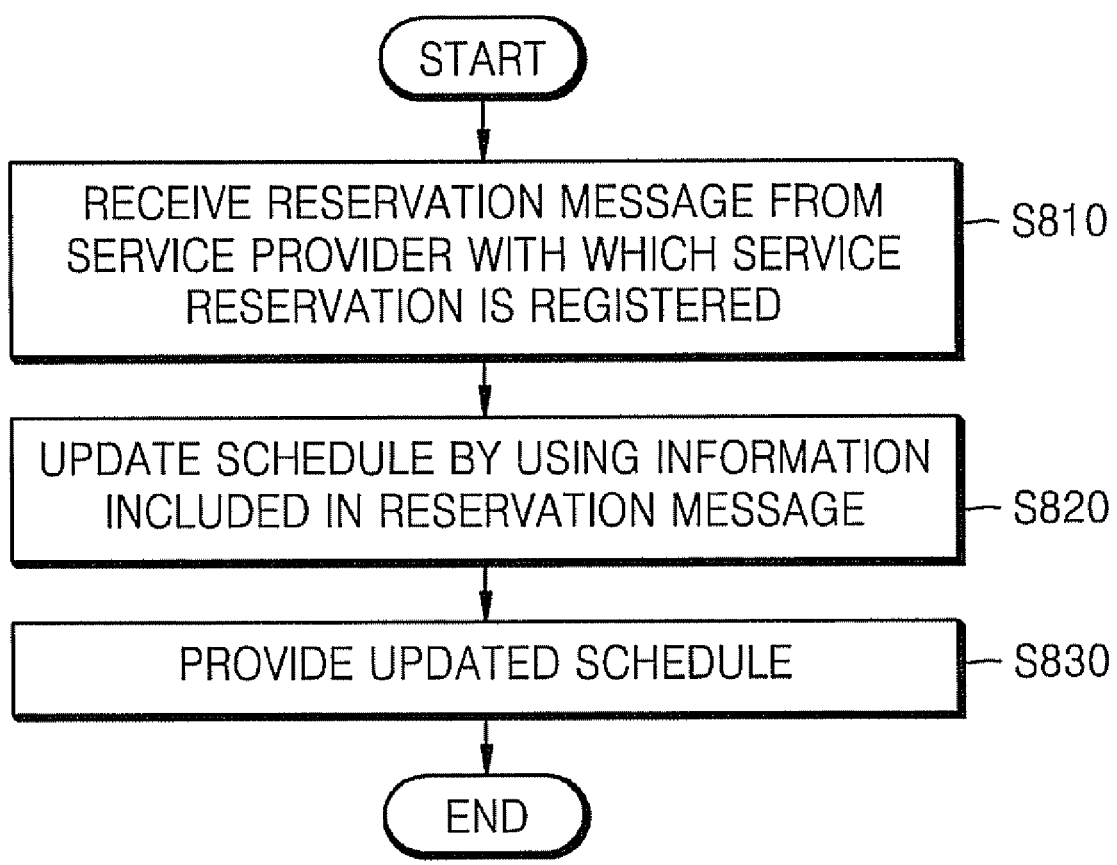
FIG. 8 is a flowchart illustrating a method of managing a user's schedule according to an embodiment of the present invention.

FIG. 8 is a flowchart illustrating a method of managing a user's schedule according to an embodiment of the present invention. Referring to FIG. 8, an apparatus for managing a user's schedule receives a reservation message from a service provider with which a service reservation by a user is registered in operation S810. It is understood that before operation S810, an operation for authenticating a service provider may further be included, thereby allowing a reservation message from only an authenticated service provider to be received.

Information included in a reservation message may include at least one of a service reservation place, a service reservation time, a number of persons for the service reservation, a contact point of a service provider, a server address of the service provider, and an icon for Internet or mobile telephone connection to the service provider.

Next, the user's schedule is updated in operation S820 by using the information included in the reservation message. It is understood that only part of the information included in the reservation message may be added to the user's schedule. This part to be added may be automatically extracted from the reservation message or selected by the user.

The updated user's schedule is then provided in operation S830. The reservation message may be provided with at least one of an icon for updating the user's schedule according to the reservation message, an icon for providing a user's schedule update list, an icon with which the user sets a service provider providing the reservation message as a favorite, an icon for providing a favorites list, an icon for storing the reservation message, and an icon for providing a list of stored reservation messages. Each of the user's schedule update list, the favorite list, and the reservation message list may include an icon for setting a service provider as a favorite. Also, an automatic update setting icon may be provided with the reservation message to set the service provider corresponding to the reservation message such that automatic updating of the user's schedule according to reservation messages received form the service provider may be performed.

Figure 9:
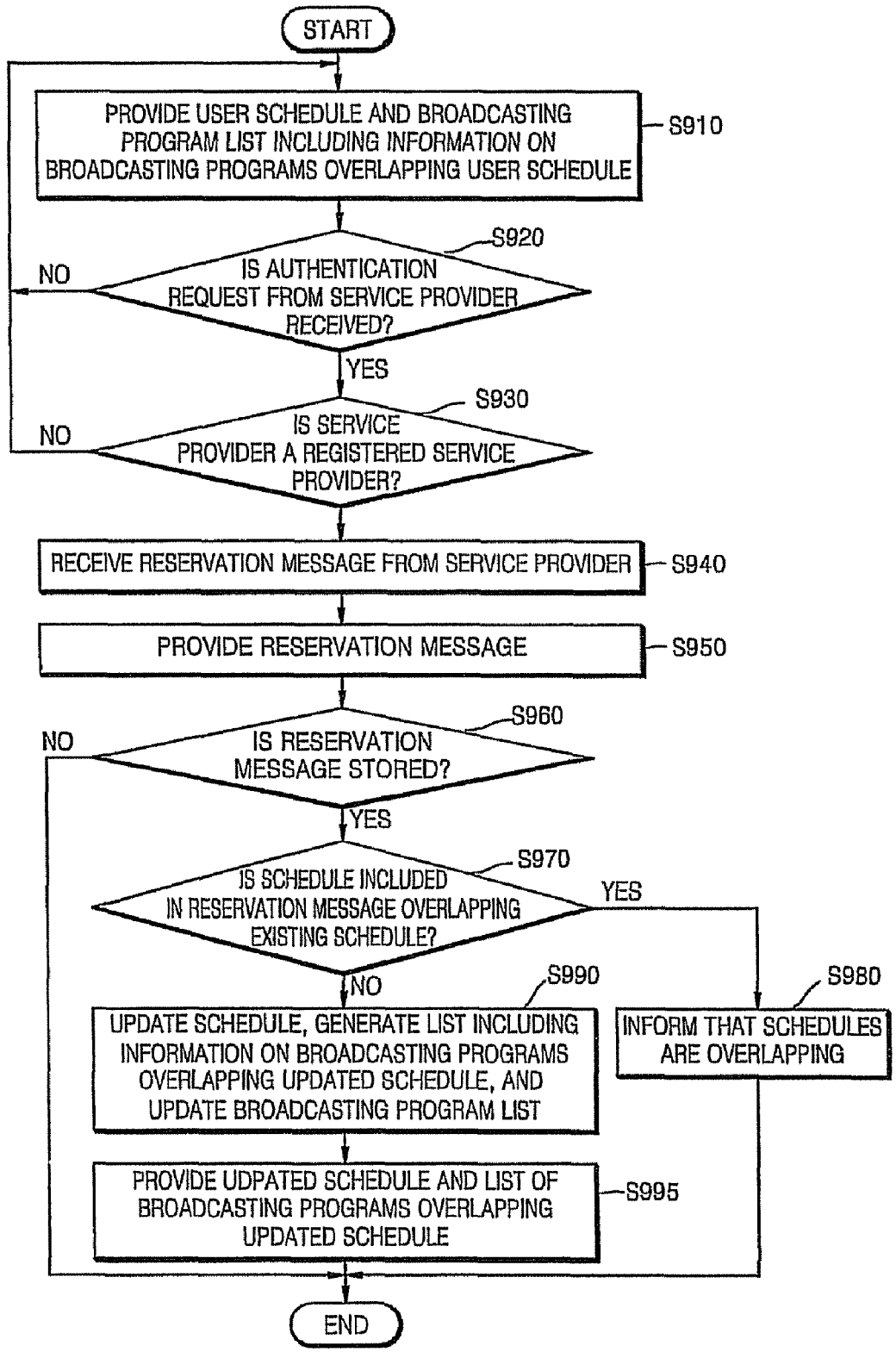
FIG. 9 is a flowchart illustrating a method of managing a user's schedule according to another embodiment of the present invention.

FIG. 9 is a flowchart illustrating a method of managing a user's schedule according to another embodiment of the present invention. An apparatus for managing a user's schedule provides the user's schedule and a broadcasting program list including information on broadcasting programs overlapping the user's schedule in operation S910.

If an authentication request from a service provider is received in operation S920, it is determined in operation S930 whether the service provider is a registered service provider whose authentication can be performed so that a reservation message from the service provider can be received.

If it is determined that the service provider is a registered service provider (operation S930), a reservation message is received from the service provider in operation S940. Then, the reservation message is processed and provided to the user. The reservation message may be provided with one or more icons to perform control operations related to the reservation message according to a user's input.

In operation S960, a user's input signal to store the reservation message is received, and it is determined whether the schedule (i.e., time entry) included in the reservation message overlaps the user's schedule in operation S970. If the service provider that transmits the reservation message is a service provider with which the user's schedule is set to be automatically updated, operation S960 may be omitted.

If the schedules are overlapping (operation S970), the user is informed that the schedules are overlapping in operation S980. If the schedules are not overlapping (operation S970), the schedule (i.e., time entry) in the reservation message is added to the user's schedule, thereby updating the user's schedule and the broadcasting program list accordingly in operation S990.

Lastly, the updated user's schedule and a list of broadcasting programs overlapping the updated user's schedule are provided in operation S995.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

According to aspects of the present invention, a user's schedule can be updated with a reservation message received from a service providing server that provides a service reserved by a user. Accordingly, even when the user schedule information is not manually input, the user can conveniently manage the schedule. In particular, when the user's schedule changes because of an addition, a modification, or a cancellation of a service reservation, the user's schedule can be managed with a user terminal apparatus by informing the service provider of only the changed contents of the user's schedule. Also, by providing information on broadcasting programs overlapping the user's schedule, broadcasting program information can be efficiently received while managing the user's schedule.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A method of managing a user schedule in a terminal apparatus, the method comprising:
    receiving a reservation message from a service provider with which a service reservation by a user is registered;

updating the user schedule automatically by adding an entry to the user schedule according to information included in the reservation message; and providing the updated user schedule.

2. The method as claimed in claim 1, wherein the updating of the user schedule is performed automatically when the service provider is preset as an automatic update service provider.

3. The method as claimed in claim 1, wherein the updating of the user schedule further comprises:

adding the entry to the user schedule such that the entry includes information that is selected by the user from the information included in the reservation message.

4. The method as claimed in claim 1, wherein the information included in the reservation message comprises one of a service reservation location, a service reservation time, a number of persons for the service reservation, a contact point of the service provider, a server address of the service provider, an option to place a telephone call to the service provider, or combinations thereof.

5. The method as claimed in claim 4, wherein the information included in the reservation message further comprises an advertisement.

6. The method as claimed in claim 1, further comprising:
receiving an input from the user to perform a control operation related to the reservation message.

7. The method as claimed in claim 6, wherein the reservation message comprises one or more options corresponding to one or more control operations such that the input from the user selects an option to perform a corresponding control operation related to the reservation message.

8. The method as claimed in claim 7, wherein the one or more options includes one of an option for updating the user schedule with the information included in the reservation message, an option for providing a list of reservation messages that have updated the user schedule, an option for adding the service provider providing the reservation message to a list of favorite service providers, an option for providing the list of favorite service providers, an option for storing the reservation message, an option for providing a list of stored reservation messages, or combinations thereof.

9. The method as claimed in claim 8, wherein each of the list of reservation messages that have updated the user schedule, the list of favorite service providers, and the list of stored reservation messages includes an option for setting the service provider as a favorite service provider.

10. The method as claimed in claim 7, wherein the one or more options includes an automatic update setting option to set the service provider as the automatic update service provider.

11. The method as claimed in claim 1, further comprising:
authenticating the service provider, wherein the updating of the user schedule is not performed if the service provider is not authenticated.

12. The method as claimed in claim 1, further comprising:
providing a broadcasting program list including information on at least one broadcasting program that overlaps the user schedule.

13. The method as claimed in claim 12, wherein the broadcasting program list is updated whenever the user schedule is updated.

14. The method as claimed in claim 1, further comprising:
if a reservation time included in the reservation message overlaps an existing entry in the user schedule, informing the user that the reservation time overlaps the existing entry.

15. A non-transitory computer-readable recording medium encoded with the method of claim 1 and implemented by a computer.

16. An apparatus for managing a user schedule, the apparatus comprising:
a communication unit to receive a reservation message from a service provider with which a service reservation by a user is registered; and
a control unit to update the user schedule automatically by adding an entry to the schedule according to information included in the reservation message, and to provide the updated schedule of the user.

17. The apparatus as claimed in claim 16, wherein the control unit automatically updates the user schedule when the service provider is preset as an automatic update service provider.

18. The apparatus as claimed in claim 16, wherein the control unit adds the entry to the user schedule such that the entry includes information that is selected by the user from the information included in the reservation message.

19. The apparatus as claimed in claim 16, further comprising:
an input unit to receive an input from the user to perform a control operation related to the reservation message.

20. The apparatus as claimed in claim 19, wherein the reservation message comprises one or more options corresponding to one or more control operations such that the input from the user selects an option to perform a corresponding control operation related to the reservation message.

21. The apparatus as claimed in claim 16, further comprising:
a broadcasting program information management unit to manage broadcasting program information, wherein
the control unit provides a broadcasting program list including information on at least one broadcasting program that overlaps the user schedule.

22. The apparatus as claimed in claim 21, wherein the control unit updates the broadcasting program list whenever the user schedule is updated.

23. The apparatus as claimed in claim 16, wherein:
the control unit determines whether a reservation time included in the reservation message overlaps an existing entry in the user schedule; and
the control unit informs the user that the reservation time overlaps the existing entry if the reservation time overlaps the existing entry.

24. A method of managing a user schedule in a terminal apparatus, the method comprising:
receiving a reservation message from a service provider with which a service reservation by a user is registered;
providing a broadcasting program list including information on at least one broadcasting program that overlaps an entry in the user schedule, wherein:
the broadcasting program list does not include information on broadcasting programs that do not overlap at least one entry in the user schedule; and
updating the user schedule automatically by adding an entry to the user schedule according to information included in the reservation message.

25. An apparatus for managing a user schedule, the apparatus comprising:
a communication unit to receive a reservation message from a service provider with which a service reservation by a user is registered;
a broadcasting program information management unit to manage broadcasting program information; and a control unit to provide a broadcasting program list including information on at least one broadcasting program that overlaps an entry in the user schedule, wherein:

the broadcasting program list does not include information on broadcasting programs that do not overlap at least one entry in the user schedule; and the control unit updates the user schedule automatically by adding an entry to the user schedule according to information included in the reservation message.

26. A method of managing a user schedule in a terminal apparatus, the method comprising:

receiving a reservation message from a service provider with which a reservation by a user is registered;

updating the user schedule automatically using information from the reservation message, when the service provider is preset as an automatic update service provider.

27. An apparatus for managing a user schedule, the apparatus comprising:

a communication unit to receive a reservation message from a service provider with which a reservation by a user is registered; and a control unit to update the user schedule automatically using information from the reservation message, when the service provider is preset as an automatic update service provider.

28. A method of managing a user schedule in a terminal apparatus, the method comprising:

receiving a reservation message from a service provider with which a service reservation by a user is registered;

updating the user schedule automatically or according to a user input by adding an entry to the user schedule according to information included in the reservation message;

providing the updated user schedule; and receiving an input from the user to perform a control operation related to the reservation message, wherein the reservation message comprises one or more options corresponding to one or more control operations such that the input from the user selects an option to perform a corresponding control operation related to the reservation message, wherein the one or more options includes one of an option for updating the user schedule with the information included in the reservation message, an option for providing a list of reservation messages that have updated the user schedule, an option for adding the service provider providing the reservation message to a list of favorite service providers, an option for providing the list of favorite service providers, an option for storing the reservation message, an option for providing a list of stored reservation messages, or combinations thereof, and wherein each of the list of reservation messages that have updated the user schedule, the list of favorite service providers, and the list of stored reservation messages includes an option for setting the service provider as a favorite service provider.

29. A method of managing a user schedule in a terminal apparatus, the method comprising:

receiving a reservation message from a service provider with which a service reservation by a user is registered;

updating the user schedule automatically or according to a user input by adding an entry to the user schedule according to information included in the reservation message;

providing the updated user schedule; and receiving an input from the user to perform a control operation related to the reservation message, wherein the reservation message comprises one or more options corresponding to one or more control operations such that the input from the user selects an option to perform a corresponding control operation related to the reservation message, wherein the one or more options includes an automatic update setting option to set the service provider as an automatic update service provider.

* * * * *